US006433904B1

(12) United States Patent
Swanson et al.

(10) Patent No.: US 6,433,904 B1
(45) Date of Patent: Aug. 13, 2002

(54) METHOD AND APPARATUS FOR IMPROVING TRANSMISSION PERFORMANCE OVER WAVELENGTH DIVISION MULTIPLEXED OPTICAL COMMUNICATION LINKS USING FORWARD ERROR CORRECTION CODING

(75) Inventors: Eric A. Swanson, Acton; Richard Barry, Brookline; Murat Azizoglu, North Billercia, all of MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/361,927

(22) Filed: Jul. 27, 1999

(51) Int. Cl.⁷ .............................................. H04J 14/02
(52) U.S. Cl. ...................... 359/133; 359/110; 359/124; 359/161; 359/173; 359/181; 359/187; 359/188; 359/194; 359/195
(58) Field of Search ................................. 359/110, 124, 359/133, 161, 187, 194, 181, 188, 195, 173

(56) References Cited

U.S. PATENT DOCUMENTS

| 4,694,471 A | 9/1987 | Blesser ........................ 375/45 |
| 4,995,101 A | * 2/1991 | Titterton et al. ............. 455/607 |
| 5,018,142 A | * 5/1991 | Simcoe et al. ............... 370/112 |

(List continued on next page.)

OTHER PUBLICATIONS

Dutton, H., "Understanding Optical Communications", pp 386–387, Prentice Hall PTR, 1998.
Optical Fiber Communication Conference (OFC) and the International Conference on Intergrated Optics and Optical Fiber Communications (IOOC), "Concatenated FEC Experiment Over 5000 KM Long Straight Line WDM Test BED" Technical Digest Conference Edition, San Diego, California (1999).
LEOS Summer Topical Meeting Digest on Integrated Opto-electronics, (1994).
Kaminow et al., Optical Fiber Telecommunications (IIIA), "Coding and Error Correction in Optical Fiber Communications Systems", Chapter 3, (1977).

*Primary Examiner*—Leslie Pascal
*Assistant Examiner*—Hanh Phan
(74) *Attorney, Agent, or Firm*—Lahive & Cockfield, LLP (57) ABSTRACT

Data transmission apparatus includes first and second optical transmitters coupled to an optical link. A forward error correction (FEC) coder is coupled to the input of the second optical transmitter. A first information signal having a first information rate is provided to the first optical transmitter, and a second information signal having a second information rate is provided to the second optical transmitter. The use of the FEC coder enables the second information signal to have a higher information rate than the first information signal, while simultaneously enabling the respective output power levels of the first and second optical amplifiers to be substantially equal. The data transmission apparatus achieves higher data transmission capacity while retaining compatibility with pre-existing fiber spans and amplifier nodes. An optical transmission system incorporates an optical transmitter and an optical receiver having certain transmission characteristics, such as output power level, decision threshold level, etc., that are adjustable in response to bit error rate information. A bit error rate estimator is provided at the receiving end of the optical link. The bit error rate estimator estimates the bit error rate of the received information signal, and provides bit error rate information to the optical receiver, and/or the optical transmitter, and/or the optical link, based on the estimated bit error rate, in order to optimize the performance of the transmission system.

8 Claims, 7 Drawing Sheets

U.S. PATENT DOCUMENTS

| | | | | |
|---|---|---|---|---|
| 5,311,346 A | * | 5/1994 | Haas et al. | 359/156 |
| 5,504,609 A | | 4/1996 | Alexander et al. | 359/125 |
| 5,532,864 A | | 7/1996 | Alexander et al. | 359/177 |
| 5,557,439 A | | 9/1996 | Alexander et al. | 359/130 |
| 5,602,669 A | * | 2/1997 | Chaki | 359/181 |
| 5,671,156 A | * | 9/1997 | Weerackody et al. | 364/514 R |
| 5,680,238 A | * | 10/1997 | Masuda | 359/132 |
| 5,696,615 A | | 12/1997 | Alexander | 359/134 |
| 5,712,932 A | | 1/1998 | Alexander et al. | 385/24 |
| 5,715,076 A | | 2/1998 | Alexander et al. | 359/130 |
| 5,726,784 A | | 3/1998 | Alexander et al. | 359/125 |
| 5,745,582 A | * | 4/1998 | Shimpuku et al. | 381/77 |
| 5,784,184 A | * | 7/1998 | Alexander et al. | 359/125 |
| 5,798,855 A | | 8/1998 | Alexander et al. | 359/177 |
| 5,808,760 A | * | 9/1998 | Gfeller | 359/110 |
| 5,808,766 A | * | 9/1998 | Van de Voorde et al. | 359/140 |
| 5,938,309 A | * | 8/1999 | Taylor | 359/124 |
| 5,940,439 A | * | 8/1999 | Kleider et al. | 375/225 |
| 5,969,840 A | * | 10/1999 | Roberts | 359/161 |
| 6,031,644 A | * | 2/2000 | Utsumi | 359/110 |
| 6,040,933 A | | 3/2000 | Khaleghi et al. | 359/124 |
| 6,115,157 A | * | 9/2000 | Barnard et al. | 359/124 |
| 6,181,450 B1 | * | 1/2001 | Dishman et al. | 359/124 |
| 6,185,022 B1 | * | 2/2001 | Harasawa | 359/124 |
| 6,226,296 B1 | * | 5/2001 | Lindsey et al. | 370/401 |
| 6,233,077 B1 | * | 5/2001 | Alexander et al. | 359/133 |

* cited by examiner

METHOD AND APPARATUS FOR IMPROVING TRANSMISSION PERFORMANCE OVER WAVELENGTH DIVISION MULTIPLEXED OPTICAL COMMUNICATION LINKS USING FORWARD ERROR CORRECTION CODING

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The invention relates to the field of fiber optic communications systems, and in particular to wavelength division multiplexed transmission systems and networks.

There is a pressing need for increased transmission capacity over installed optical fibers. One effective commercialized method to achieve greater transmission capacity is to use wavelength division multiplexing (WDM), a technique for simultaneously transmitting several optical signals on a single optical fiber. There are a large number of installed WDM transmission systems throughout the world. All of these installed systems are limited in the number of wavelengths or channels they can support and the data rate at which individual channels can be modulated. These limitations arise from system losses, fiber non-linearities, chromatic and polarization dispersion, polarization dependent losses, coherent and incoherent crosstalk, and performance limitations of installed optical amplifiers.

In WDM transmission systems, the information-carrying optical signals are transmitted on end-to-end links. Each link is typically divided into numerous segments or spans, and signal regeneration technology is used between spans to provide amplification and other signal compensation to overcome losses and distortion from the preceding span. There are a variety of types of regeneration technologies. They can be purely electronic, purely optical, or a combination of both. One type uses an optical amplifier, and is referred to herein as an amplifier node. A known type of optical amplifier in widespread use today is the Erbium Doped Fiber Amplifier, or EDFA. Other types include Raman amplifiers (bulk and distributed) and semiconductor optical amplifiers. Amplifier nodes can also include compensation components, such as dispersion compensating fibers to compensate for distortion such as chromatic dispersion, and polarization mode distortion (PMD) compensators. Amplifier nodes can also contain gain equalization components to adjust the gains of the individual wavelengths of the system, as well as optical spectrum monitors to monitor the power, wavelength, and quality of the individual optical wavelengths.

Many of the performance characteristics of existing optical communication systems are influenced by the characteristics of basic system components, such as the fibers and the optical amplifiers, which are expensive hardware components intended for long and continuous service. Important fundamental characteristics include the gain and saturated output power of the optical amplifiers, and the losses, dispersion, non-linearities, polarization-dependent losses, channel isolation, and PMD caused by the fiber spans and optical components within the system. Existing optical communication equipment has been designed in a manner that reflects the characteristics of these components. Key system parameters include the maximum number of channels or wavelengths per fiber, the frequency or wavelength spacing between channels, and the data rate and optical power level of each channel.

Thus, upgrading a system to take advantage of newer technology can involve significant expense, as well as disruptions in service, to change amplifiers, fibers and/or other basic system components. For example, a known type of existing system is a WDM OC-48 system, where OC-48 refers to a standard optical signal format for transmitting data at 2.488 Gb/s. Upgrading some or all channels of a 32-channel WDM OC-48 system to OC-192 (a 9.952 Gb/s signal) can require replacing each optical amplifier in the system with a new amplifier having 6 dB more output power, in order to retain desired signal quality. Optical amplifiers can cost on the order of $100,000 apiece, so the cost of such an upgrade can be substantial. Furthermore, there is no guarantee that the fibers can carry the required additional power without causing unacceptable signal degradation due to fiber nonlinearities. Non-linearities in other system components (e.g. dispersion compensating fiber) may also degrade the signal unacceptably. Non-linearities tend to increase with optical signal power, so that in some cases 6 dB more signal power may cause in excess of 12 dB more fiber non-linearities. Adequate optical regeneration of the degraded signal may not be possible. Thus, there are significant obstacles to be overcome to increase transmission capacity in optical communication systems.

It has been known to use forward error correction coding (FEC) of optical data signals to improve WDM transmission systems. One technique is shown in a paper written by Livas et al. entitled "Forward Error Correction in a 1 Gb/s/Channel Wavelength-Division Multiplexed System", Proceedings of the IEEE Lasers and Electro-Optics Society Summer Topical Meeting on Optical Networks and Enabling Technologies, Lake Tahoe, Nev., July 11–13, paper W2.5, 61–62 (1994). This paper shows that the use of FEC enables the system to better tolerate channel-to-channel crosstalk, so that channel spacing can be reduced without compromising performance.

Different results are shown in a paper by Puc et al. entitled "Concatenated FEC Experiments Over 5000 km Long Straight Line WDM Testbed", Proceedings of the Optical Fiber Communication Conference, OFC 1999, San Diego, Calif., February 20–25, paper ThQ6, p 255, (1999). This paper shows that the use of FEC can improve performance in undersea systems having no repeaters. In particular, Puc et al. show that a system designed with coded signals can have better system noise margin and reduced pulse distortion in long optical amplified digital transmission systems. In addition, this improved margin can be used to design the system with increased amplifier spacing and/or increased system capacity and/or decreased channel spacing.

U.S. Pat. No. 5,715,076 to Alexander shows a system in which selected channels have remodulators 30 and remodulation selectors 100 that include FEC coders/decoders. The use and benefit of FEC coding are described in column 6 from line 8 to line 38. While Alexander shows the use of FEC, it does not teach how to utilize FEC to increase the transmission capacity in an installed WDM transmission link.

This previous work has not focused on the problems associated with upgrading an existing and installed WDM transmission system.

BRIEF SUMMARY OF THE INVENTION

In accordance with the present invention, a method and apparatus are disclosed for upgrading existing optical communications systems to provide increased transmission capacity without incurring the expense of replacing optical amplifiers or fiber spans. Disclosed data transmission apparatus includes first and second optical transmitters coupled to an optical link. A forward error correction (FEC) coder is coupled to the input of the second optical transmitter. A first information signal having a first information rate is provided to the first optical transmitter, and a second information signal having a second information rate is provided to the second optical transmitter. The use of the FEC coder enables the second information signal to have a higher information rate than the first information signal, while simultaneously enabling the respective output power levels of the first and second optical amplifiers to be substantially equal. The data transmission apparatus achieves higher data transmission capacity while retaining compatibility with existing fiber spans and amplifier nodes.

A disclosed optical transmission system incorporates an optical transmitter and an optical receiver having certain transmission characteristics, such as output power level, decision threshold level, etc., that are adjustable in response to bit error rate information. A bit error rate estimator is provided at the receiving end of the optical link. The bit error rate estimator estimates the bit error rate of the received information signal, and provides bit error rate information to the optical transmitter and/or the optical receiver and/or elements within the transmission link based on the estimated bit error rate, in order to optimize the performance of the transmission system.

Other aspects, features, and advantages of the present invention are disclosed in the detailed description that follows.

BRIEF DESCRIPTION OF THE SEVERAL VIEWS OF THE DRAWING

FIG. 2 (consisting of FIGS. 2a, 2b, and 2c) depicts optical signal spectra in existing and upgraded WDM transmission systems with and without FEC coding;

DETAILED DESCRIPTION OF THE INVENTION

Figure 1:
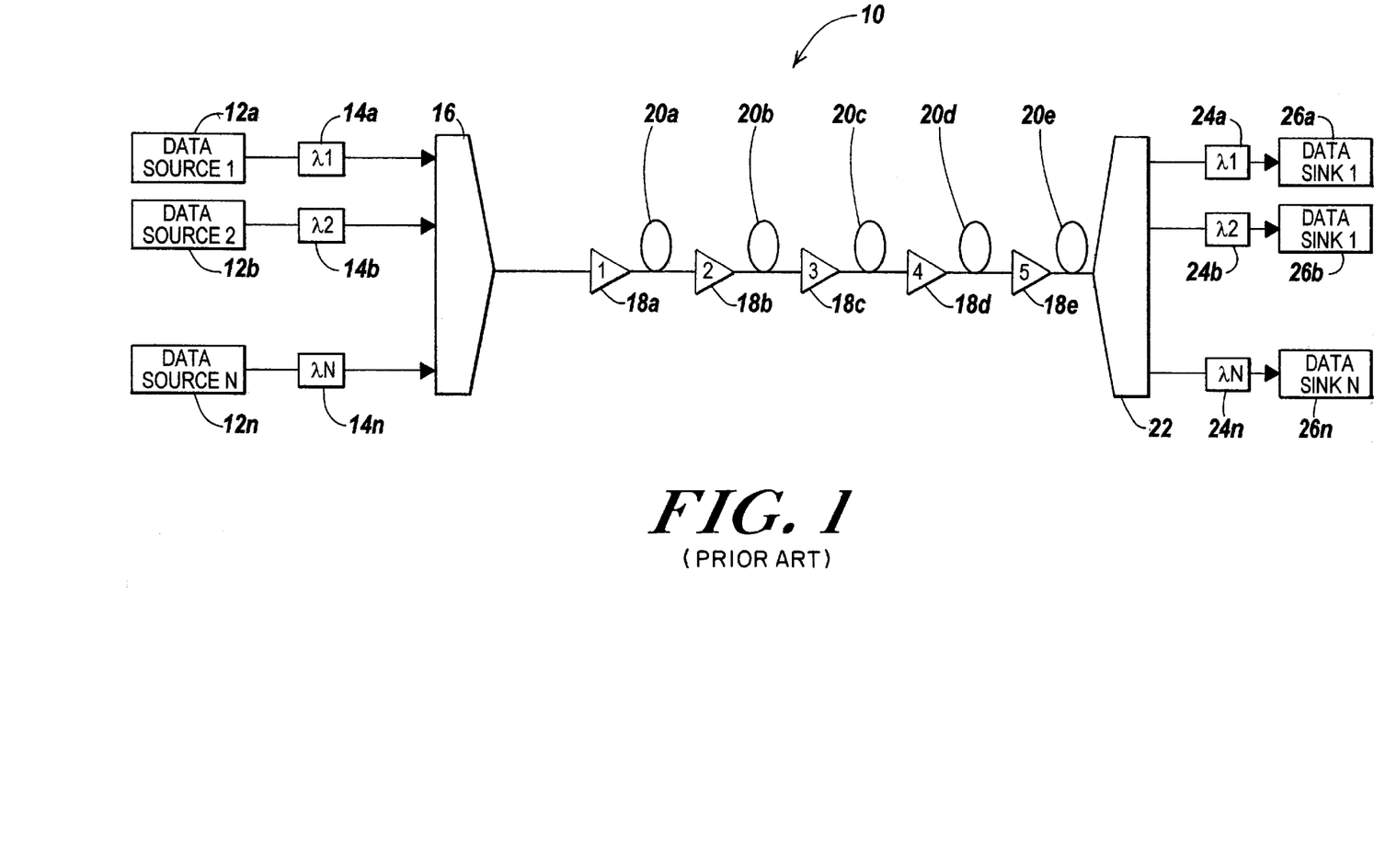
FIG. 1 is a block diagram of an exemplary prior art WDM point-to-point transmission system.

Referring to FIG. 1, a prior art point-to-point WDM system 10 is depicted. A plurality of data sources 12a through 12n are coupled to a corresponding plurality of WDM transmitters 14a through 14n. The WDM transmitters 14a–14n convert electrical signals received from the respective data sources 12a–12n to optical signals, which are forwarded to a WDM combiner 16. The output of the combiner 16 is coupled to a booster amplifier 18a, which in turn is coupled to a fiber optic span 20a. The fiber optic span 20a is coupled to another booster amplifier 18b, which drives a fiber optic span 20b. As illustrated, a series of booster amplifiers 18a–18e drive a series of fiber optic spans 20a–20e respectively. The last fiber optic span 20e is coupled to a receiver 22. The receiver 22 optically demultiplexes the optical signal to produce a plurality of optical signals at wavelengths $\lambda_1$ through $\lambda_n$. The optical signals are coupled to optical to electrical converters 24a–24n which output electrical signals to respective data sinks 26a–26n. Note that typically another optical amplifier referred to as a preamplifier (not shown in FIG. 1) is used after span 20e and before demultiplexer 22.

FIG. 1 shows transmission in a single direction between end points of a link. Not shown is that the link may be bidirectional. To achieve bidirectional transmission, either two fibers can be used (one transmitting in each direction), or one fiber can be used with the eastbound and westbound traffic on different wavelengths. In the latter case, there are several choices as is known in the art including interleaving odd and even channels in the east and west bound directions or sending bands of frequencies in opposite directions (e.g. the Red and Blue Bands within the conventional EDFA C-Band, or using the C-band for one direction and L-band for another). The transmission capacity of a particular link is typically upgraded in both directions at the same time. A bidirectional interface may consist of one card having both a transmitter and a receiver, or it may be packaged on multiple cards.

Figure 2A:
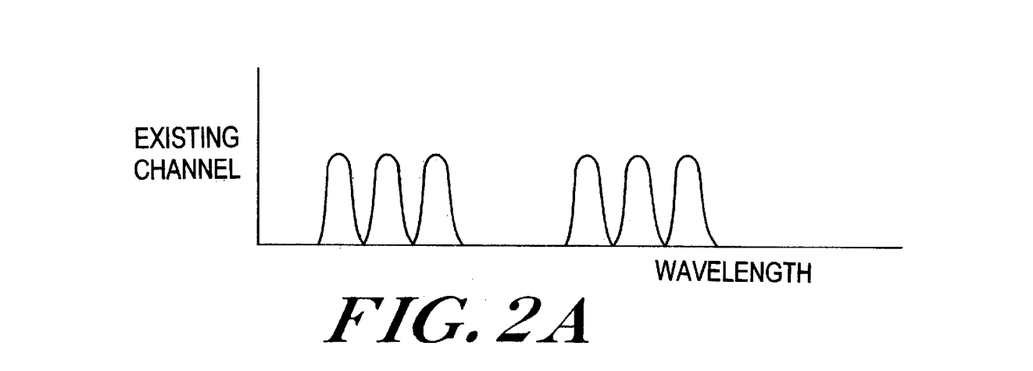
Figure 2B:
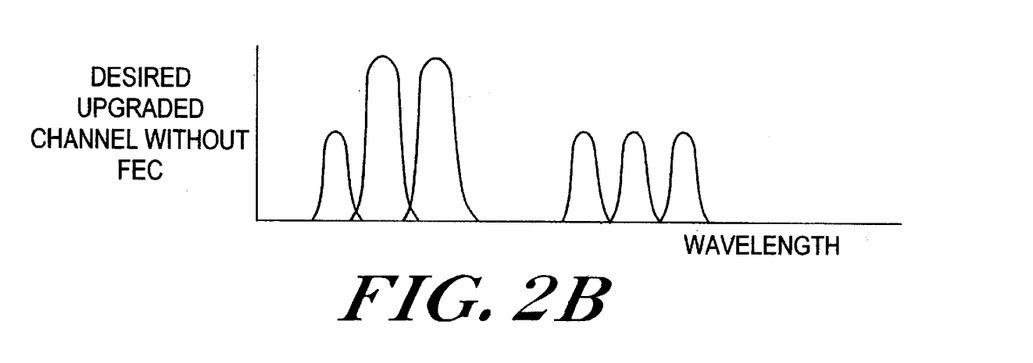

FIG. 2a illustrates the transmitter power employed for the optical channels within an existing WDM link. It is assumed that the signals at the varying wavelengths are transmitted with approximately equal power. If it is desired to upgrade one or more of the channels in the WDM link to a higher data rate, the signal power of the upgraded channels must generally be increased commensurately, to achieve the same bit error rate (BER) for the channel as before the upgrade. Exemplary signal spectra are shown in FIG. 2b, in which it is assumed that the data rates of channels 2 and 3 are to be doubled. In addition to increasing the power of the upgraded channel, it is often necessary to add other components such as dispersion compensating filters to enable transmission at the higher speed. This dispersion (or other) compensation can be added at the transmitter, at the receiver, or at an amplifier node, or any combination of the three.

Unfortunately, increasing power in one or more channels results in an increase in the overall signal level generated by the amplifier at each amplifier node. However, it may not be possible to increase overall output power in an existing system, either because the amplifiers are already operating at maximum output power, or an increase in fiber non-linearities would cause unacceptable performance. As a result, increased transmission capacity often cannot be attained by simply increasing signal power.

Figure 2C:
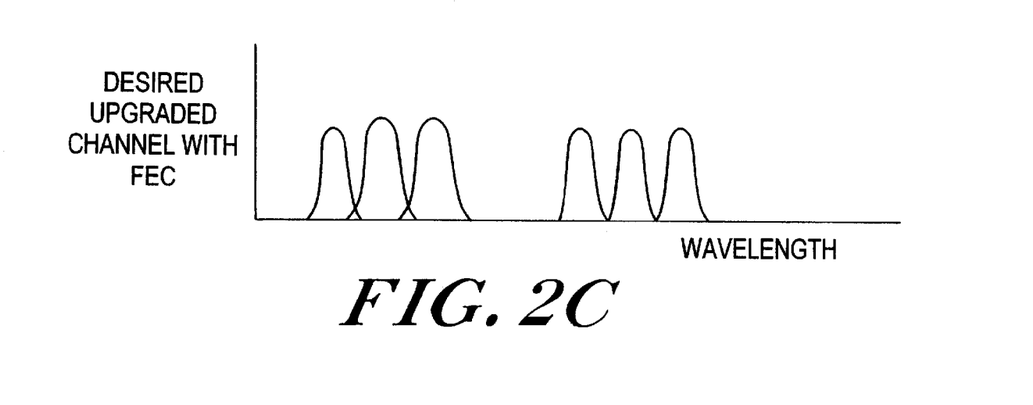

FIG. 2c shows preferred signal spectra resulting from an upgrade. The data rates of channels 2 and 3 have been increased by a factor of two. However, the power levels of channels 2 and 3 are substantially the same as their pre-upgrade levels, so that there is no increase in overall signal power. As described below, this result can be achieved by using Forward Error Correction (FEC) coding in the upgraded channels. Increased transmission capacity is achieved without the need to replace optical amplifiers and/or fiber spans.

Figure 3:
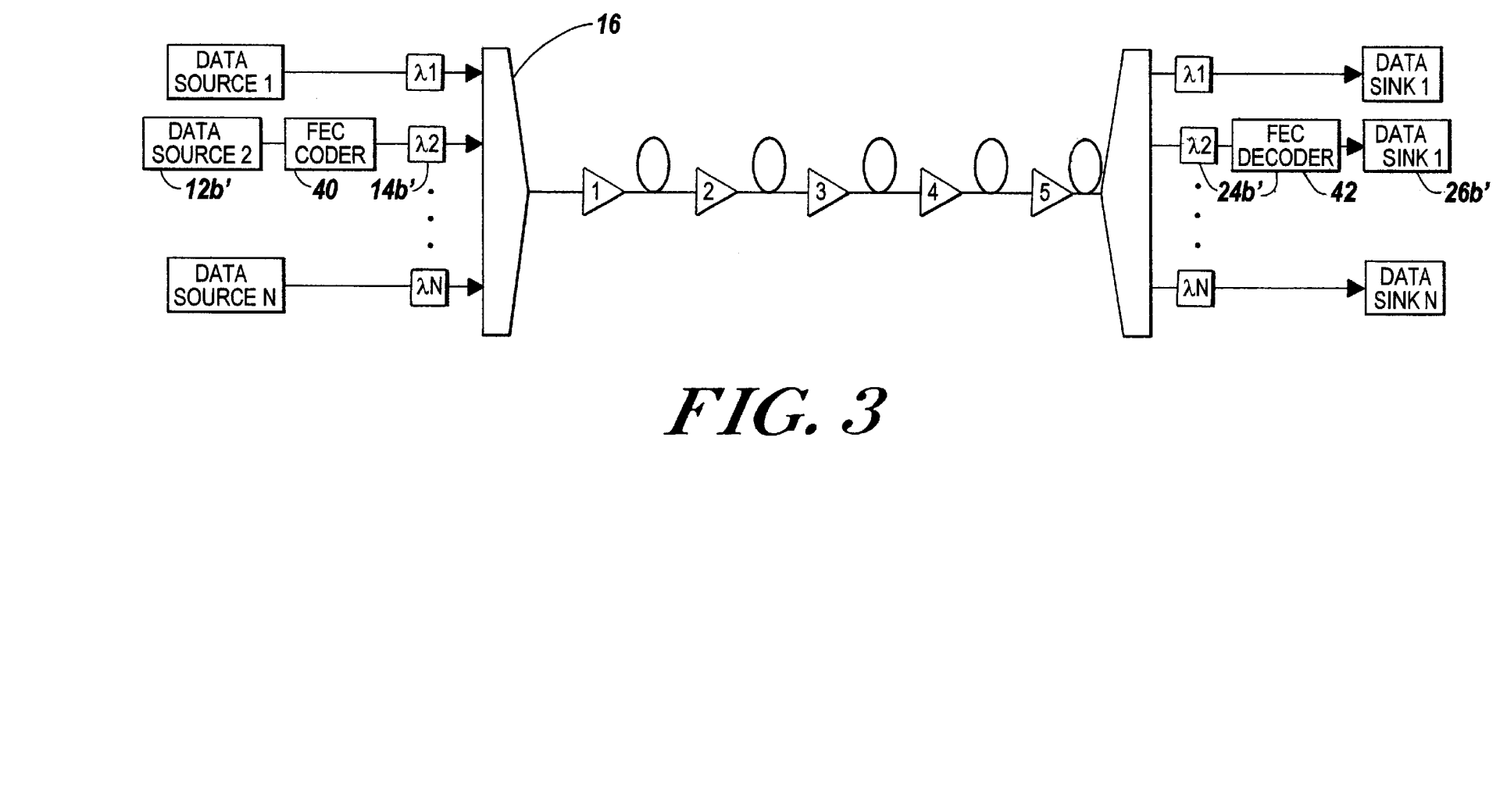
FIG. 3 is a block diagram of a first type of upgraded WDM system using FEC coding.

As shown in FIG. 3, an upgraded channel includes a Forward Error Correction (FEC) encoder 40 installed between the data source (e.g. higher-speed data source 12b') and the combiner 16, and a FEC decoder 42 installed between the receiver 22 and the data sink (e.g. higher-speed data sink 26b'). The use of FEC coding increases noise immunity in the channel substantially. In the system of FIG. 3, the improved noise immunity is exploited to transmit a higher data rate optical signal without a substantial commensurate increase in power level. It will be appreciated that the FEC coding itself consumes some of the additional transmission bandwidth, due to the inherent redundancy of error correction coding. Nevertheless, the overall net information rate of the channel can be increased substantially. By selection of a suitable FEC code, it is possible to increase the net channel information rate by a factor of four or more.

An important attribute of an error correcting code is referred to as "coding gain". The coding gain indicates the effective increase in signal-to-noise ratio (SNR) attained by use of the code. For example, if a system experiences a given information bit error rate (BER) at a SNR of 20 dB without coding, and experiences the same BER at a SNR of 15 dB with coding, then the code has provided 5 dB of coding gain. When an optical channel is upgraded in the manner shown in FIG. 3, it is necessary to identify the code properties (e.g. coding gain, rate, and burst error correction capabilities) required to enable the desired increase in channel data rate without unacceptably impacting other channels or the overall WDM signal. The following factors should be considered:

1. Maintain Channel Launched Power

The launched power out of the transmitter WDM multiplexer 16 should not be significantly greater than the original launched power. This condition ensures that the new channel, now operating at an increased data rate, has not robbed optical amplifier power from existing channels or increased non-linear effects (such as self-phase modulation, cross-phase modulation, or four wave mixing) thereby degrading the BER of existing channels.

2. Minimize Cross Talk to Adjacent Channels

The upgraded channel tends to occupy a wider optical spectrum due to the increased information rate and the code rate. It may be necessary to slightly reduce the optical signal power in the encoded channel to avoid injecting an undesirable level of crosstalk into neighboring channels. The coding gain of the upgraded channel should be chosen to compensate for this reduction in transmitted signal power.

3. Maintain acceptable BER in Encoded Channel

The error correcting capabilities of the upgraded channel must be sufficient to support the desired BER (e.g. $10^{-12}$) on the upgraded channel after meeting conditions 1 and 2 above. Thus, the code must also compensate for any increased (and otherwise uncompensated) transmission impairments such as chromatic dispersion, polarization mode dispersion, and finite filter bandwidth arising from the increased data rate on the fiber. For many links, it is beneficial to add compensation elements in addition to the FEC to optimize overall performance. For example, in upgrading from OC-48 to OC-192, chromatic dispersion is approximately 4 times more severe at OC-192 than and OC-48. Typically, OC-192 systems can tolerate on the order of 1000 ps/nm of dispersion and maintain approximately a 1 dB SNR penalty. If the fiber span between electronic repeaters causes greater dispersion, the FEC coding gain can be sized to overcome the increased dispersion penalty. It may be preferable, however, to add one or more dispersion compensating elements to the link as is known in the art. Dispersion compensation components can be placed at the transmitter, at the receiver, or at the amplifier nodes, or at some combination of them as is known in the art.

4. Channel Upgrades

The coding gain should be chosen to allow for the impact of contemporaneous or future upgrading of neighboring channels and the associated increase in crosstalk similar to factor 2 above.

For example, consider a link having 5 ps/nm-km of dispersion and 6 amplifiers (six spans), each having 17 dBm output power, 25 dB gain, and 6 dB optical noise figure. This link might support about 40 wavelengths (channels) at OC-48 with about 4 dB of link margin depending on the transmitter, receiver, and link qualities. To upgrade channels to OC-192 without FEC coding, each upgraded channel requires an additional 6 dB of power. Because of the power limit imposed by the existing amplifiers and fiber spans, only about 10 upgraded channels can be supported at the increased power per channel. However, using FEC with a coding gain of about 6–8 dB in each channel and 2640 ps/nm dispersion compensating fiber (of opposite sign appropriately placed throughout the transmission span as is known in the art) at the transmitter and receiver, this same link can support 40 wavelengths (channels) at OC-192.

While in the system of FIG. 3 increased system capacity is achieved by an increase in the data rate(s) of one or more channels, an alternative method for increasing system capacity is to increase the number of channels. This method has the advantage of not requiring special upgrades to the amplifier nodes, such as the addition of dispersion compensating fiber. This method also avoids problems associated with the detrimental effects of polarization mode dispersion on the transmission of higher speed signals. The factors to be considered for establishing FEC coding gain when channel spacing is to be reduced are similar to those described above. If the fiber and amplifier or transmission bandwidth is not fully utilized, then additional channels can be added at the current channel spacing. However, if the amplifier output power or fiber non-linearities are such that the addition of new channels would unduly load the existing span, then some combination of new and upgraded channels spacing using FEC coding must be added. Some of the channels in the resulting mix may be more closely spaced than before the upgrade. The FEC coding gain in the new and upgraded channels should be chosen to maintain the total upgraded output power not significantly above the original non-upgraded power output while maintaining acceptable BER in all channels. As described above, the coding gain can also take into consideration the possibility of future upgrades.

There is yet another way of using FEC coding to increase transmission capacity. It may be desirable to increase the data rate on one or more channels of a link to a level at which real-time encoding and decoding is not feasible or practical. For example, using current technology it is not feasible to perform FEC coding and decoding at the OC-192 rate of 9.952 Gb/s, but it is feasible to do so at the OC-48 rate of 2.488 Gb/s. It is possible, nonetheless, to operate one or more uncoded channels at an extra-high rate, such as 9.952 Gb/s, by boosting the power level of each such channel such that an acceptable BER is obtained. In order to stay within power limits imposed by the link, the power levels of the other, lower-rate channels on the link are reduced. FEC coding is used in these channels so that they can be operated at their pre-upgrade data rates without appreciable degradation in their respective BERs.

There are many considerations for choosing the forward error correcting code. One consideration is that at high transmission rates, such as OC-48 and higher, hardware implementation of the FEC encoder and decoder is required. A particularly suitable code for this purpose is the Reed-Solomon (RS) code. The RS code operates on symbols from a q-ary alphabet to form code words of length $N=q-1$ symbols. In practice, $q=2^k$ is used, with a symbol being formed from a k-bit block (codes having k=8 are commonly used, resulting in blocks of 2040 bits). For example, a (255, 239) RS code provides 4–7 dB coding gain, and reduces the BER from $10^{-5}$ raw to below $10^{-20}$. Due to these desirable features, Reed-Solomon codes have been used in transcontinental optical submarine systems.

Reed-Solomon codes are an example of block codes. Block codes operate on fixed-size block inputs and produce fixed-size output blocks. Other block codes, such as Bose-Chaudri-Hocquenghem (BCH) codes, may also be employed. Block codes are typically used with high code rates, and can be decoded in software or in hardware. Block codes are good choices for lowering the bit error rate of a channel from a moderate amount, say $10^{-5}$ raw, to a very small amount, e.g. $10^{-5}$ or less. Block codes do not generally work well for higher channel error rates. In addition, block codes have limited ability to decode correlated burst errors.

Another class of codes are convolutional codes, which operate on a continuous data stream to produce an encoded stream. Convolutional codes are used mostly in high BER environments (e.g. $10^{-2}$) and utilize low code rates (e.g., ½ or ⅓). The Viterbi algorithm, which is a "maximum likelihood" decoding algorithm, can be used to decode convolutional codes, and can be implemented both in software and in hardware.

Convolutional codes and block codes can be concatenated to form a very powerful code particularly useful on channels with high BER, e.g. $10^{-2}$. The convolutional code is used as the inner code to reduce the channel error rate to a moderate level, e.g. from $10^{-2}$ to $10^{-5}$, and the block code is then used to essentially remove all remaining errors. Coding gains of up to 10 dB have been achieved in optical submarine systems using serial concatenation. Parallel concatenation is also possible, resulting in the so-called "turbo" codes, which are decoded iteratively.

BER performance can also be further improved by using soft-decision decoding on the convolution code, for example using the soft-output Viterbi algorithm (SOVA). When SOVA is used as the inner decoder, the input to the block decoder is a sequence of unquantized real numbers instead of a binary sequence. In principle, soft-decision decoding can contribute an additional 2 dB to the coding gain. Concatenated convolutional and block codes are particularly useful on channels with correlated burst errors. In this instance, the convolutional code not only reduces the raw channel error rate, but also disperses the remaining errors into different blocks through the use of an interleaver, thus reducing the problem block codes have with correlated burst errors.

There are many considerations in choosing the code appropriate for upgrading the data rate of an existing channel on an existing system without changing the optical amplifiers and other optical hardware. One consideration already mentioned is that at high data rates the code should be capable of hardware implementation. Another consideration is that the coding gain should be sufficient to counteract the amplifier power requirements of the optical amplifiers. Thus, if the system was originally designed for a channel at rate R, and it is desired to utilize that channel at rate R', then a code with coding gain of nominally $10*\log_{10}(R'/R)$ should be chosen. For instance, if R=2.5 Gb/s and R'=10 Gb/s, then a code with coding gain of 6 dB counteracts the higher power requirements of the uncoded signal. Thus a Reed-Solomon block code might suffice. Keeping the power level of the R' signal nominally the same as that of the rate R signal also insures that nonlinear effects are not exacerbated. Thus block codes are useful for these types of channels.

However, other considerations come into play when using a channel at rate R' which was originally designed for rate R. Of particular concern are chromatic dispersion and polarization mode dispersion. The effects of dispersion in optical systems become more pronounced at higher signaling rates. Dispersion causes intersymbol interference, which degrades system performance and can introduce correlated burst errors. Thus, in this situation, a concatenated convolutional and block code may be appropriate. In such a situation, the convolution code rate should be kept relatively high, e.g. greater than ⅔, in order to avoid introducing excessive dispersion in the raw channel.

Another way to utilize an existing channel at a higher error rate is to use multiple lower rate signals, a technique described below with reference to FIG. 4. The signals may be presented to the system at the lower rate, or an aggregate rate signal may be broken up into multiple lower rate signals through the use of a technique called "inverse multiplexing", or a combination of the two techniques can be used. This technique can reduce the effects of dispersion on the individual signals. In such a situation, the individual channels may be block encoded, convolutionally encoded, or encoded using a concatenation of block and convolutional codes. In addition, coding may be done across channels, where the bits of the distinct channels are jointly encoded and decoded. This technique is particularly useful as a countermeasure for wavelength-dependent polarization mode dispersion (PMD). Polarization mode dispersion (PMD) is a particularly difficult system impairment to overcome. PMD can cause bit errors through fading. Typically, PMD is uncorrelated across wavelengths. Thus when a signal at one wavelength experiences fading, it is typically the case that a signal at a sufficiently separated wavelength does not experience fading. Thus, by performing FEC coding across several wavelengths of an inverse multiplexed signal, enhanced performance can be achieved. An example of employing inverse multiplexing with joint FEC is described below with reference to FIG. 7.

Figure 4:
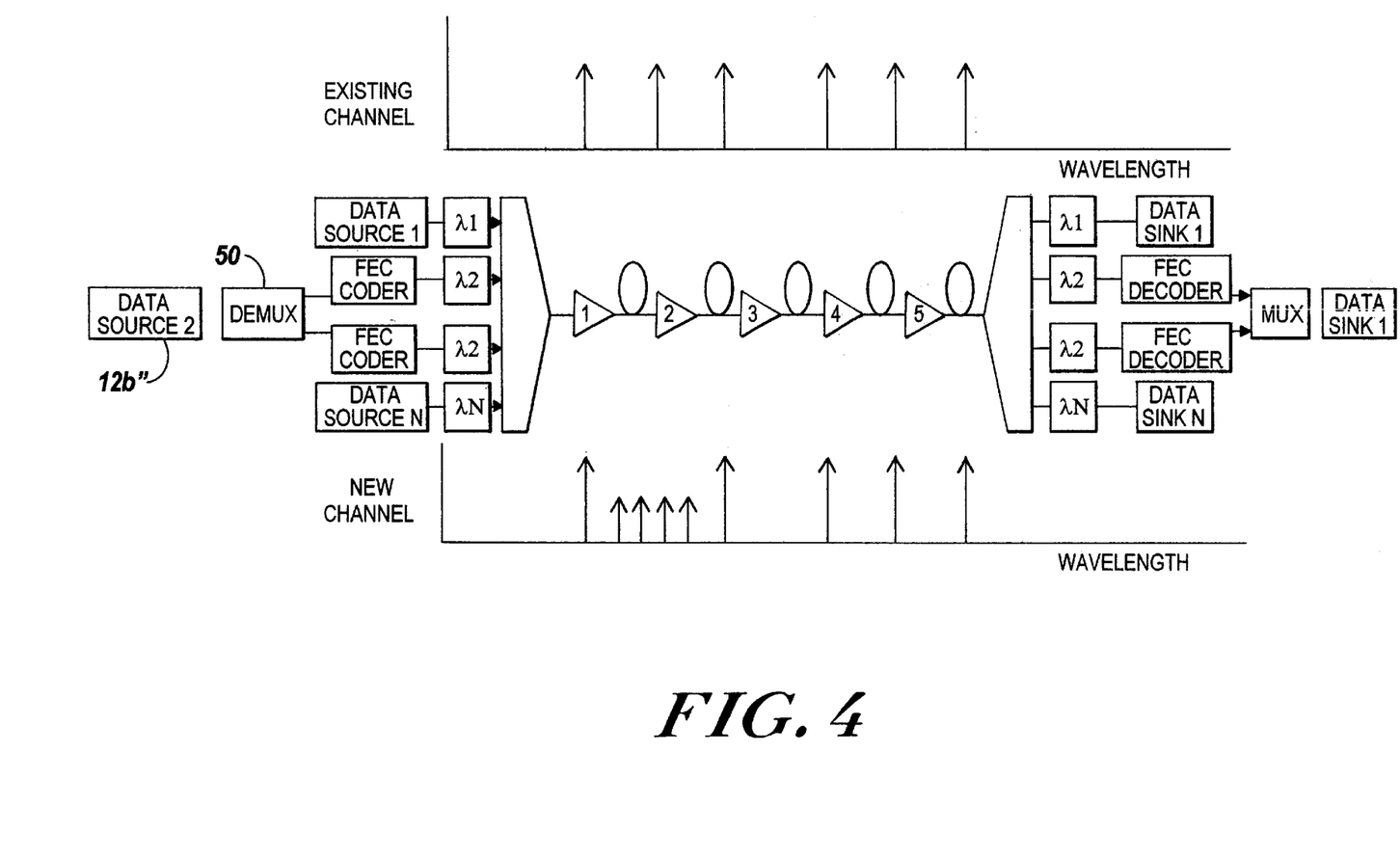
FIG. 4 is a block diagram of a second type of upgraded WDM system using FEC coding and inverse multiplexing, along with plots of signal spectra in both the original and upgraded systems.

As shown in FIG. 4, it is also possible to use FEC coding in conjunction with inverse multiplexing. This method can overcome detrimental PMD and other effects from older installed fibers. The spectrum previously occupied by a single wavelength channel becomes occupied by a plurality of lower-power channels that collectively carry the information emanating from a single source 12b'''. The high-speed data signal is de-multiplexed by a de-multiplexer 50 into multiple lower-speed channels for transmission over the link, and is re-multiplexed at the receiver by a multiplexer 52. Synchronization circuitry (not shown in FIG. 4) is employed so that the individual data streams are properly reassembled in time. Synchronization can be accomplished in a variety of known ways, including for example pointer processing techniques such as used in SONET systems. In a system employing inverse multiplexing, the coding can be done on a per channel basis, or across the channels, as discussed above.

Figure 5:
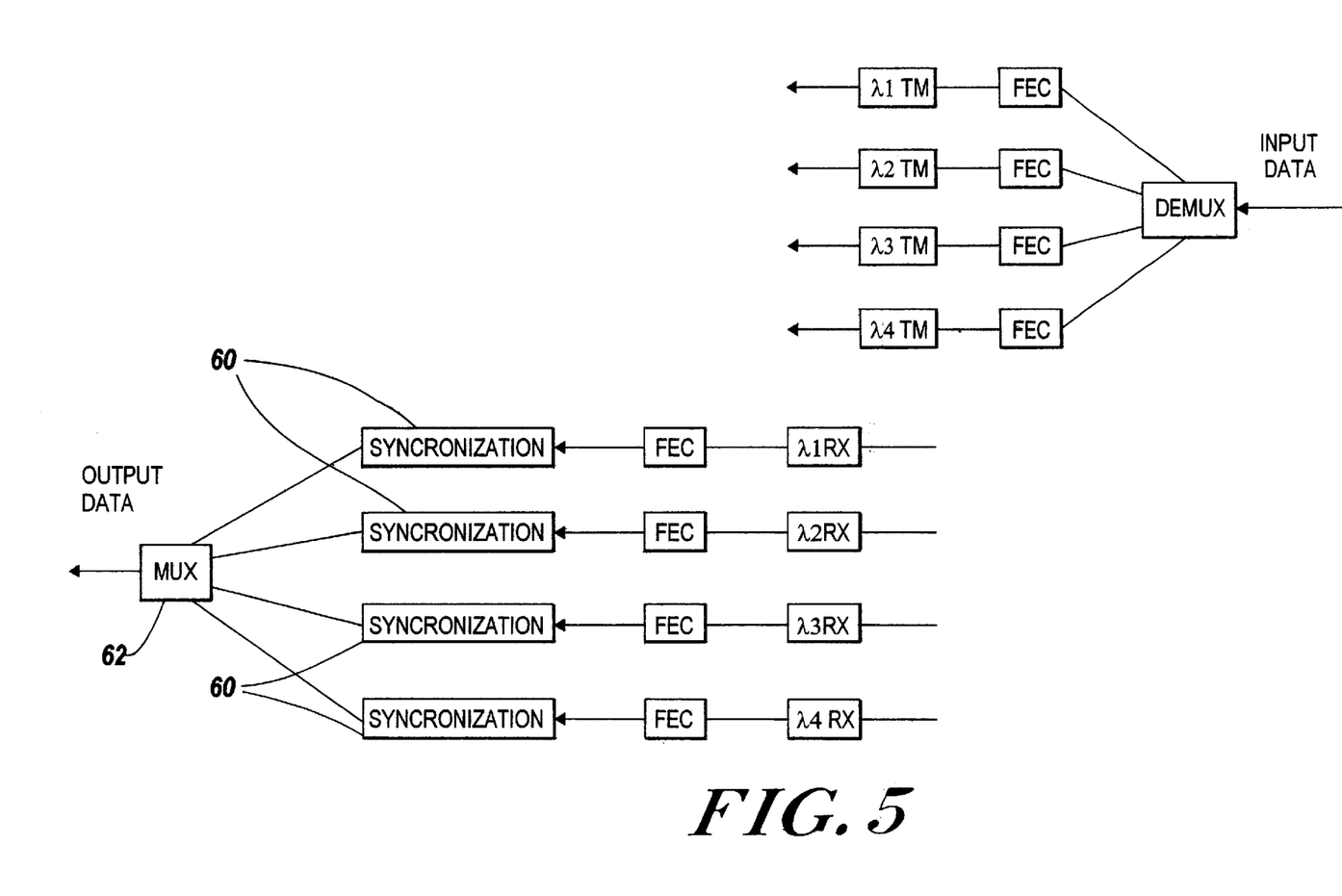
FIG. 5 is a block diagram illustrating details of the system of FIG. 4 using inverse multiplexing.

FIG. 5 shows an exemplary embodiment of the general inverse multiplexing scheme of FIG. 4. In the illustrated embodiment, FEC coding is employed at the demultiplexed data rate; it may optionally be employed at the aggregate data rate emanating from the source 12b" of FIG. 4 instead. At the receiver, due to varying chromatic and PMD dispersion, the data bits do not arrive consistently fixed in time with respect to one another. Synchronization circuits 60 provide the necessary buffering and time alignment of the data bits before they are re-multiplexed by multiplexer 62.

As suggested in FIG. 4, it may be preferable to space the WDM channels very closely when employing inverse multiplexing, so that the combined multiple channels fit through existing filters used in the system. For example, in an OC-48 system with original channel spacing of 100 GHz and 30 GHz channel bandwidth, it is possible to place four sub-channels within the 30 GHz bandwidth. To provide good performance, it is necessary to accurately stabilize the operating wavelengths of the lasers generating the sub-channel signals. This can be ensured by using wavelength-locking techniques as is known in the art.

It may be desirable in some WDM transmission systems to have an accurate estimate of the received BER, which is often directly related to the optical SNR. In non-coded WDM channels, the channel BER may be on the order of $10^{-15}$. It can take a long time to measure such a low BER, so obtaining an accurate estimate can be very difficult. In a coded system, the raw channel BER is typically much higher (e.g. $10^{-2}$ to $10^{-5}$), and therefore much easier to measure. When the raw channel error rate gets large, e.g. higher than $10^{-2}$, then other considerations come into play, in particular the ability to recovery the clock. In order to minimize clock recovery jitter it may be necessary to lower the clock recovery noise or phase-lock loop bandwidth. However, for some networks the requirement of maintaining timing jitter rejection and tracking requirements limit how small the loop bandwidth can be. For such a system, it can be beneficial to use a code with a strong harmonic of the clock frequency or a self-synchronizing code as is known in the art. The BER can be measured directly using the FEC decoder, or it can be estimated from a measure of the optical or electrical SNR as is known in the art. Once the raw channel BER is known, the BER of the information signal can be mathematically determined from a previously established channel to information coding transfer BER curve.

Figure 6:
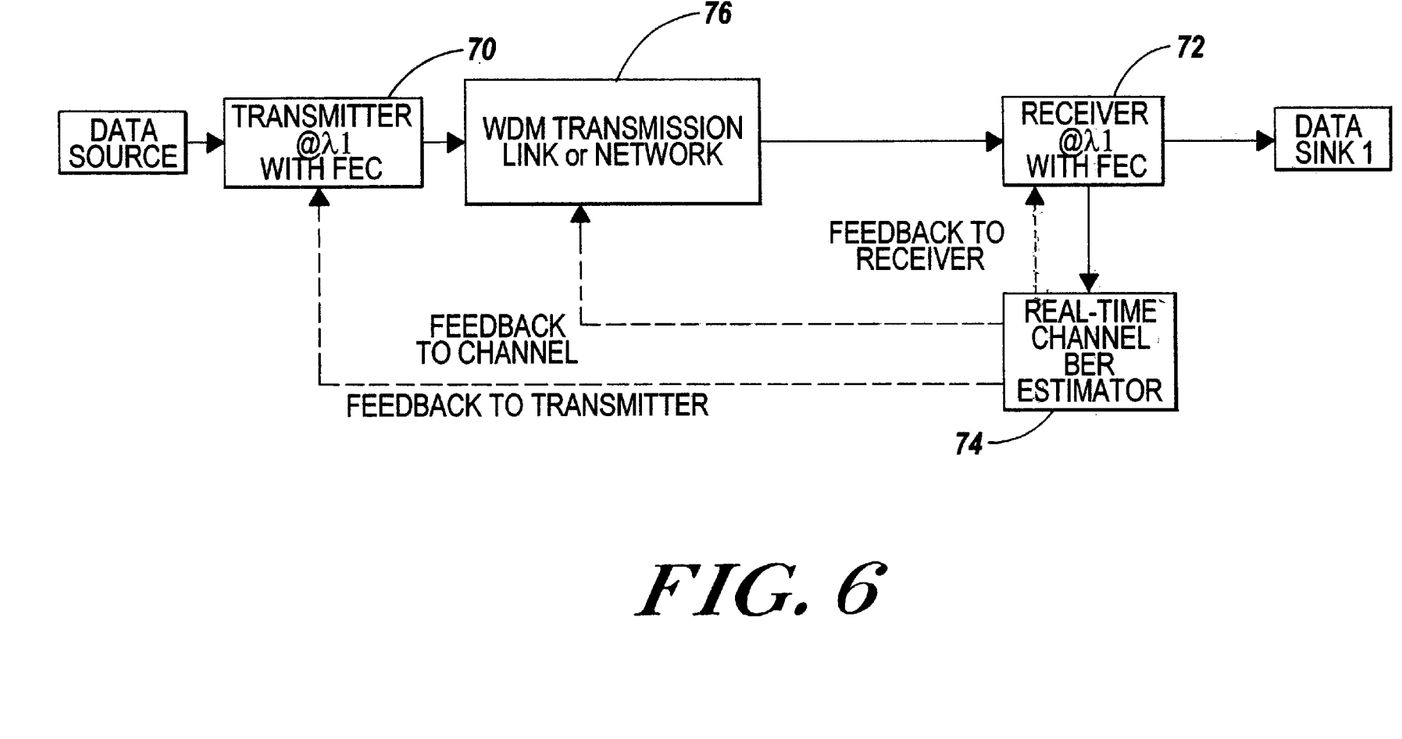
FIG. 6 is a block diagram of a third type of upgraded WDM system in which an estimate of channel bit error rate (BER) is used to mitigate transmission impairments.

A measure or estimate of BER in an FEC-enhanced system can be used for real-time adaptive control of a variety of parameters along an optical transmission path. A general block diagram of a system having such adaptive control is shown in FIG. 6. The system employs an FEC-enhanced transmitter 70 and receiver 72, with inputs for receiving BER estimation feedback from a BER estimator 74. The channel traverses a link 76 that may also operate on the fed-back BER information.

The following kinds of system parameters may be advantageously controlled: source laser transmitted power at the entrance of the channel to the link or network 76 (using a variable optical attenuator (VOA) or other means); polarization state of the light from transmitter 70 entering link 76; levels of chirp or dispersion compensation at various points in the channel; gain of one or more optical amplifiers within the link 76; levels of PMD compensation in the transmitter 70 or receiver 76; and decision threshold values such as phase and/or threshold offsets in the receiver 72. The output from the BER estimator 74 can also be fed back to a polarization controller in a first or second order PMD compensator (not shown in FIG. 6).

For decision threshold adjustment, a standard dithering feedback loop can be applied to optimize the decision threshold. Dithering can be directly applied to the channel, or alternatively can be applied to a protected channel in a transmission link having both a primary and a fallback or protected channel. In the latter approach, dithering generally has only minimal effect on the received data. Switching to the protected channel occurs only when the received data is close to or out of BER specification and the protected channel is in BER specification. Other algorithms can also be utilized, such as notifying the network operator of the potential to switch to the protected channel to significantly improve BER performance.

As previously described, it is possible to employ inverse multiplexing with joint FEC coding to improve link performance. Consider the upgrading of four OC-48 channels each to OC-192. Here the OC-192 channels may be coded individually, or coding can be done across the channels to alleviate the effects of polarization mode dispersion and nonlinearities that lead to frequency-dependent fading channel type behavior. In other applications of this concept, each OC-192 can be broken into individual OC-48s, or OC-48s may be presented to the system individually, and coding can be done across a subset of the OC-48s across multiple channels of the original system.

Figure 7:
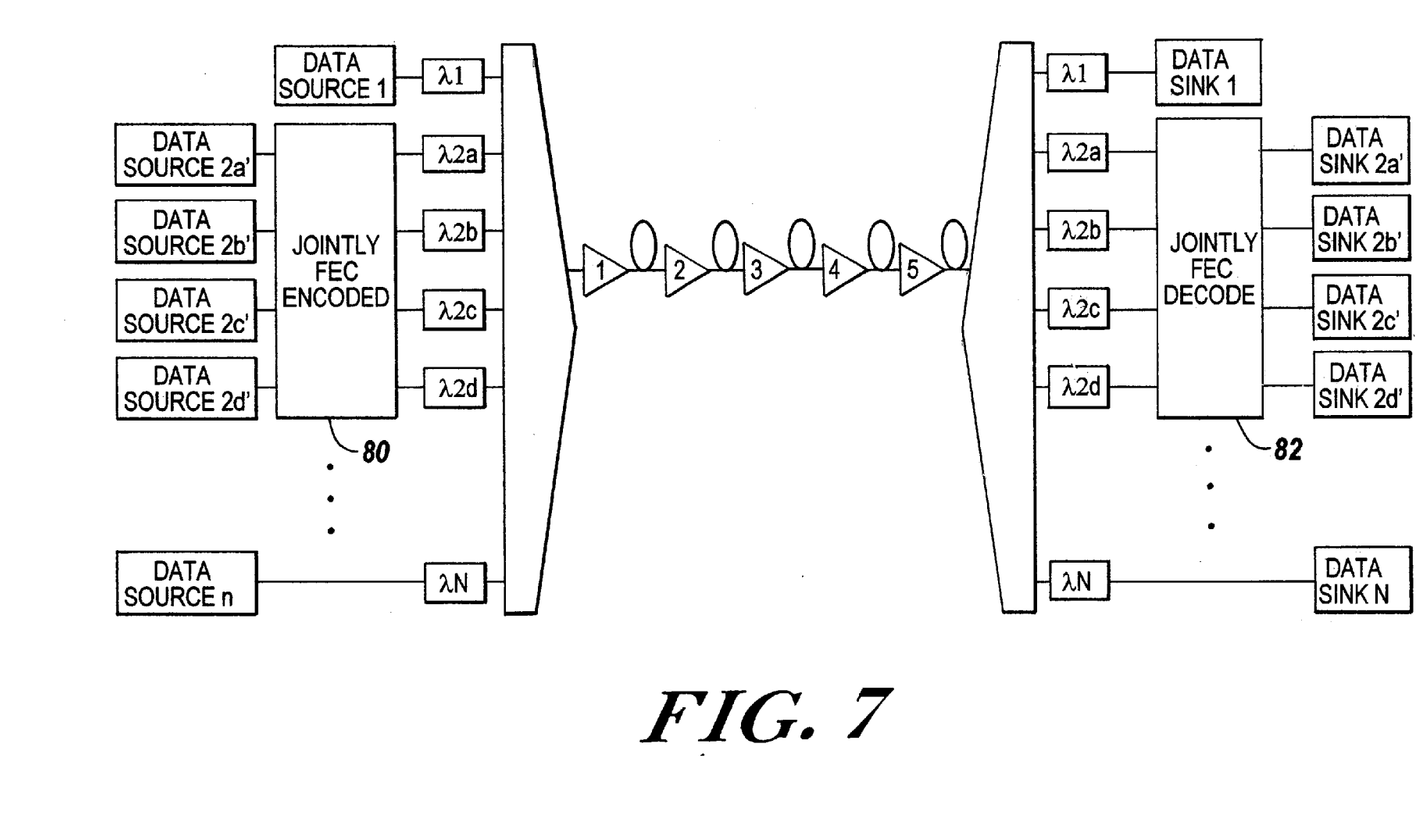
FIG. 7 is a block diagram of an upgraded WDM system in which four OC-48 links have been upgraded to four OC-192 links using joint FEC coding across the four channels.

A specific example is shown in FIG. 7. Data from four sources $2a'-2d'$ are jointly encoded using a FEC encoder 80, and decoded by a joint FEC decoder 82. The FEC encoder 80 forms uncoded symbols by collecting groups of bits from the different sources $2a'-2d'$. These symbols are encoded, and different bits of the resulting multi-bit codewords are transmitted over the four different channels. At the receiver end, the FEC decoder 82 collects bits from the different channels to form encoded symbols, decodes these symbols, and distributes the bits of the decoded symbols to the respective data sinks. As mentioned above, this approach can provide excellent performance even in PMD-limited transmission through its use of statistically independent channels, similar to interleaving. The separate channels need not occupy adjacent wavelengths. A standard synchronizer (not shown) is needed between the transmitter and receiver to account for the effect of varying group delay across the channels, as is known in the art.

The use of FEC coding on wavelength division multiplexed optical communication links has been described. It will be apparent to those skilled in the art that modifications to and variations of the above-described techniques are possible without departing from the inventive concepts disclosed herein. Accordingly, the invention should be viewed as limited solely by the scope and spirit of the appended claims.

What is claimed is:

1. A wavelength division multiplexed optical transmission system, comprising:

a network having at least one optical amplifier driving at least one optical fiber;

a first data source operative to provide a first information signal at a first information rate;

a first optical transmitter coupled to said first data source and operative to transmit said first information signal over said network at a first wavelength and at a first optical power through said at least one optical fiber;

a second data source operative to provide a second information signal at a second information rate at least two times greater than said first information rate;

a forward error correction coder coupled to the output of said second data source and operative to produce an encoded representation of said second information signal; and a second optical transmitter coupled to the forward error correction coder and operative to transmit said second information signal over said network at a second wavelength and at a second optical power through said at least one optical fiber;

wherein said first and second transmitters are operative to transmit at respective optical power levels such that said first and second optical powers through said at least one fiber are substantially equal.

2. A data transmission system, comprising:

an optical link;

an optical transmitter coupled to the optical link, said optical transmitter being operative to receive an information signal from a data source and to transmit said information signal over said optical link;

an optical receiver coupled to the optical link, said optical receiver being operative to receive said information signal from said optical link and to provide said received information signal to a data sink, said optical receiver having reception characteristics that are variable in response to bit error rate information provided as input to said optical receiver; and a bit error rate estimator coupled to said optical, receiver, said bit error rate estimator being operative in response to said received information signal to estimate the bit error rate of said received information signal and to provide said bit error rate information to said optical receiver based on the estimated bit error rate.

3. A data transmission system, comprising:

an optical link;

an optical transmitter coupled to the optical link, said optical transmitter being operative to receive an information signal from a data source and to transmit said information signal over said optical link, said optical transmitter controlling a polarization state of the information signal in response to bit error rate information provided as input to said optical transmitter;

an optical receiver coupled to the optical link, said optical receiver being operative to receive said information signal from said optical link to provide said received information signal to a data sink; and a bit error rate estimator coupled to said optical receiver and to said optical transmitter, said bit error rate estimator being operative in response to said received information signal to estimate the bit error rate of said received information signal and to provide said bit error rate information to said optical transmitter based on the estimated bit error rate.

4. A data transmission system, comprising:

an optical link;

an optical transmitter coupled to the optical link, said optical transmitter being operative to receive an information signal from a data source and to transmit said information signal over said optical link;

an optical receiver coupled to the optical link, said optical receiver being operative to receive said information signal from said optical link and to provide said received information signal to a data sink;

optical components within said optical link, said optical components having transmission characteristics that are variable in response to bit error rate information provided as input to said optical components; and a bit error rate estimator coupled to said optical receiver and to said optical components in said optical link, said bit error rate estimator being operative in response to said received information signal to estimate the bit error rate of said received information signal and to provide said bit error rate information to said optical components in said optical link based on the estimated bit error rate.

5. A wavelength division multiplexed optical transmission system, comprising:

a network having at least one optical amplifier driving at least one optical fiber;

a first data source operative to provide a first information signal at a first information rate;

a first optical transmitter coupled to said first data source and operative to transmit said first information signal over said network at a first wavelength and at a first optical power through said at least one optical fiber;

a second data source operative to provide a second information signal at a second information rate at least two times greater than said first information rate;

demultiplexer and forward error correction coder apparatus coupled to the output of said second data source and operative to generate a plurality of lower-rate signals collectively constituting an encoded representation of said second information signal;

a plurality of second optical transmitters coupled to the demultiplexer and forward error correction coder apparatus, said second optical transmitters being collectively operative to transmit said lower-rate signals over said network at a corresponding plurality of wavelengths grouped around a second wavelength and substantially more closely spaced than the spacing between said first and second wavelengths, each of said second transmitters being operative to transmit the corresponding lower-rate signal through said at least one optical fiber at a respective optical power;

wherein said first and second transmitters are operative to transmit at respective optical power levels such that through said at least one fiber the collective optical power of said lower-rate signals is substantially equal to the first optical power.

6. A wavelength division multiplexed optical transmission system, comprising:

an optical link having the characteristic that optical signals of different wavelengths experience fading under different conditions, such that the likelihood of more than one of the optical signals experiencing fading simultaneously is substantially less than the likelihood of any one of the optical signals experiencing fading at a given time;

a forward error correction encoder at one end of the optical link, the forward error correction encoder being operative to form multi-bit codewords including bits from multiple data sources;

a plurality of optical transmitters, each optical transmitter being operative to transmit a respective set of bits of the codewords generated by the forward error correction coder as a respective one of the optical signals on the optical link;

a plurality of optical receivers, each optical receiver being operative to receive a respective one of the optical signals from the optical link; and a forward error correction decoder at the other end of the optical link, the forward error correction decoder being operative to (i) form received codewords including respective sets of bits from the optical receivers, (ii) decode the formed codewords into decoded symbols, and (iii) provide respective sets of bits of the decoded symbols to respective ones of multiple data sinks.

7. The system of claim 6, wherein the forward error correction coder is operative to form each codeword using bits from four data sources, the number of optical transmitters is four, the number of optical receivers is four, and the forward error correction decoder is operative to provide respective sets of bits of the received decoded symbols to respective ones of four data sinks.

8. A wavelength division multiplexed optical transmission system, comprising:

a network having at least one optical amplifier driving at least one optical fiber;

a first data source operative to provide a first information signal at a first information rate;

a forward error correction coder coupled to the output of said first data source and operative to produce an encoded representation of said first information signal;

a first optical transmitter coupled to said forward error correction coder and operative to transmit said encoded representation of said first information signal over said network at a first wavelength and at a first optical power through said at least one optical fiber;

a second data source operative to provide a second information signal at a second information rate at least two times greater than said first information rate;

a second optical transmitter coupled to said second data source and operative to transmit said second information signal over said network at a second wavelength and at a second optical power through said at least one optical fiber;

wherein said first and second transmitters are operative to transmit at respective optical power levels such that said first optical power through said at least one fiber is less than half said second optical power through said at least one fiber.

* * * * *